United States Patent
Cai et al.

(10) Patent No.: US 12,415,528 B2
(45) Date of Patent: Sep. 16, 2025

(54) COMPLEX NETWORK COGNITION-BASED FEDERATED REINFORCEMENT LEARNING END-TO-END AUTONOMOUS DRIVING CONTROL SYSTEM, METHOD, AND VEHICULAR DEVICE

(71) Applicant: JIANGSU UNIVERSITY, Zhenjiang (CN)

(72) Inventors: Yingfeng Cai, Zhenjiang (CN); Sikai Lu, Zhenjiang (CN); Hai Wang, Zhenjiang (CN); Yubo Lian, Zhenjiang (CN); Long Chen, Zhenjiang (CN); Qingchao Liu, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 18/845,007

(22) PCT Filed: Aug. 23, 2023

(86) PCT No.: PCT/CN2023/114349
§ 371 (c)(1),
(2) Date: Sep. 9, 2024

(87) PCT Pub. No.: WO2025/020250
PCT Pub. Date: Jan. 30, 2025

(65) Prior Publication Data
US 2025/0128720 A1  Apr. 24, 2025

(30) Foreign Application Priority Data
Jul. 21, 2023 (CN) .......................... 202310902155.3

(51) Int. Cl.
*B60W 50/08* (2020.01)
*B60W 60/00* (2020.01)
(Continued)

(52) U.S. Cl.
CPC .......... *B60W 50/08* (2013.01); *B60W 60/001* (2020.02); *G05B 13/027* (2013.01);
(Continued)

(58) Field of Classification Search
CPC ............... B60W 50/08; B60W 60/001; B60W 2510/188; B60W 2520/10; B60W 2520/12; G06N 3/098; G06N 3/092; G05B 13/027
See application file for complete search history.

(56) References Cited

U.S. PATENT DOCUMENTS 12,099,357 B1 *  9/2024  Ebrahimi Afrouzi ....................... G05D 1/0214
2004/0249533 A1 * 12/2004  Wheals ................... B60T 8/172
701/1
(Continued)

FOREIGN PATENT DOCUMENTS

CN  112348201 A  2/2021
CN  112465151 A  3/2021
(Continued)

OTHER PUBLICATIONS

MACAD-Gym, a Multi-Agent Connected, Autonomous Driving agent learning platform (Year: 2020).*

*Primary Examiner* — Jennifer N Welch
*Assistant Examiner* — Quoc Ly Phu Phung
(74) *Attorney, Agent, or Firm* — Bayramoglu Law Offices LLC

(57) ABSTRACT

The provided are a federated reinforcement learning (FRL) end-to-end autonomous driving control system and method, as well as vehicular equipment, based on complex network cognition. An FRL algorithm framework is provided, designated as FLDPPO, for dense urban traffic. This framework combines rule-based complex network cognition with end-to-end FRL through the design of a loss function. FLDPPO
(Continued)

employs a dynamic driving guidance system to assist agents in learning rules, thereby enabling them to navigate complex urban driving environments and dense traffic scenarios. Moreover, the provided framework utilizes a multi-agent FRL architecture, whereby models are trained through parameter aggregation to safeguard vehicle-side privacy, accelerate network convergence, reduce communication consumption, and achieve a balance between sampling efficiency and high robustness of the model.

16 Claims, 9 Drawing Sheets

(51) Int. Cl.
  *G05B 13/02* (2006.01)
  *G06N 3/092* (2023.01)
  *G06N 3/098* (2023.01)
(52) U.S. Cl.
  CPC .............. *G06N 3/092* (2023.01); *G06N 3/098* (2023.01); *B60W 2510/188* (2013.01); *B60W 2520/10* (2013.01); *B60W 2520/12* (2013.01)

(56) References Cited

U.S. PATENT DOCUMENTS

| | | | |
|---|---|---|---|
| 2017/0028499 A1* | 2/2017 | Yoshida | B25J 9/163 |
| 2022/0036122 A1* | 2/2022 | Higa | G06N 3/047 |
| 2022/0258752 A1 | 8/2022 | Kim et al. | |
| 2022/0306152 A1* | 9/2022 | Zhang | B60W 30/18159 |
| 2022/0414737 A1* | 12/2022 | Wang | G06Q 30/0627 |
| 2023/0385116 A1* | 11/2023 | Rao | G06F 9/5083 |
| 2024/0124003 A1* | 4/2024 | Wang | B60W 50/06 |
| 2024/0132088 A1* | 4/2024 | Koeberle | G06N 3/006 |
| 2024/0172283 A1* | 5/2024 | Alabbasi | G06N 3/092 |
| 2024/0174254 A1* | 5/2024 | Chen | G06F 18/214 |
| 2024/0265339 A1* | 8/2024 | Wang | G06Q 30/0202 |
| 2025/0055790 A1* | 2/2025 | Kattepur | H04L 41/16 |

FOREIGN PATENT DOCUMENTS

| | | |
|---|---|---|
| CN | 112801273 A | 5/2021 |
| CN | 115145281 A | 10/2022 |
| CN | 116027788 A | 4/2023 |
| WO | 2022237212 A | 11/2022 |

\* cited by examiner

COMPLEX NETWORK COGNITION-BASED FEDERATED REINFORCEMENT LEARNING END-TO-END AUTONOMOUS DRIVING CONTROL SYSTEM, METHOD, AND VEHICULAR DEVICE

CROSS-REFERENCE TO THE RELATED APPLICATIONS

This application is the national phase entry of International Application No. PCT/CN2023/114349, filed on Aug. 23, 2023, which is based upon and claims priority to Chinese Patent Application No. 202310902155.3, filed on Jul. 21, 2023, the entire contents of which are incorporated herein by reference.

TECHNICAL FIELD

The present disclosure belongs to the field of transportation and automated driving, and relates to a complex network cognition-based federated reinforcement learning (FRL) end-to-end automated driving control system, method, and vehicle device under dense urban traffic.

BACKGROUND

Urban driving involves a wide range of interactions between driving subjects, traffic participants and road infrastructure, and is an open problem in transportation. It is difficult to model the environment and subject cognition during dynamic interactions that present high dimensionality and diversity. Although traditional rule-based approaches are good at handling simple driving scenarios, rule-based solutions are difficult to apply when facing complex traffic situations.

On the other hand, end-to-end approaches do not rely on manually formulated rules, but rather on data-driven training methods to obtain competitive results. Deep reinforcement learning (DRL) is a typical data-driven algorithm that generates samples by interacting with the environment. The generated samples are stored in a replay buffer and used for model training through mini-batch sampling. There are drawbacks to the application of DRL due to its characteristics. First, DRL requires a large number of samples, making it more difficult to converge when training large networks compared to supervised learning. If there are not enough samples, the robustness of the model will be limited. Second, using a replay buffer imposes limitations on the network inputs, such as the size of the image inputs. The computational load and communication consumption of DRL algorithms with image inputs will increase linearly with training. In addition, end-to-end DRL as a black-box algorithm makes it difficult to understand the motivation of an agent to make decisions and lacks interpretability. Due to these limitations, DRL is mainly applied to simpler driving scenarios in its early stages.

While it is possible to deconstruct complex environments by dividing complex research scenarios into multiple single objectives. However, single-objective research approaches fall short when it comes to understanding scenarios where multiple elements interact. Despite the positive impact of deconstructing complex environments, simple splitting limits the development of automated driving towards complex environment applications.

SUMMARY

To solve the above technical problem, the present disclosure provides a complex network cognition-based FRL end-to-end autonomous driving algorithm framework federated learning based distributed proximal policy optimization (FLDPPO) under dense urban traffic. FLDPPO realizes the combination of rule-based complex network cognition and end-to-end FRL by designing a loss function. FLDPPO uses dynamic driving suggestions to guide the agent as it learns the rules, enabling it to cope with complex urban driving environments and dense traffic scenarios. Moreover, the proposed framework uses a multi-agent FRL architecture to train the model through parameter aggregation, accelerates network convergence, reduces communication consumption, and achieves a balance between sampling efficiency and high robustness of the model while protecting the privacy of the vehicle side.

In the present disclosure, a technical solution for a complex network cognition-based FRL end-to-end autonomous driving control system includes five parts: a measurement encoder, an image encoder, a complex network cognition module, a reinforcement learning module, and a federated learning module.

The measurement encoder is configured to obtain the state quantity required by the complex network cognition module and the reinforcement learning module. The state quantities required by the complex network cognition module comprise x-coordinate, y-coordinate, heading angle change and speed of the driving agent. The cognition state quantities are handed over to the complex network cognition module as input. The state quantities required by the reinforcement learning module include steering wheel angle, throttle, brake, gear, lateral speed and longitudinal speed. The RL state quantities are given to the reinforcement learning module as part of the inputs after extracting features from the two-layer fully connected network.

The image encoder is configured to obtain the amount of image implicit state required by the reinforcement learning module. The image used is a 15-channel semantic bird's eye view (BEV), $i_{RL} \in [0, 1]^{192*192*15}$. Where, 192 is in pixels and the BEV used is 5 px/m. The 15 channels contain a drivable domain, a desired path, a road edge, 4 frames of other vehicles, 4 frames of pedestrians, and 4 frames of traffic signs. The desired path is calculated using the A* algorithm. The semantic BEV is extracted by multilayer convolutional layers to extract implicit features and then passed to the reinforcement learning module as another part of the inputs.

The complex network cognition module is configured to model the driving situation of the driving subject, and to obtain the maximum risk value of the driving subject in the current driving situation according to the state quantity provided by the measurement encoder, and finally to output dynamic driving suggestions based on the risk value through an activation function.

The modeling process of the complex network cognition module constructs a dynamic complex network model with traffic participants and road infrastructure as nodes:

$$G_t = (P, E, W, \Theta)_t$$

Where, $G_t$ denotes the dynamic complex network at the moment t, $P=\{p_1, p_2, \ldots, p_N\}$ is the set of nodes, and the number of nodes is N; $E=\{e_{1,2}, e_{1,3}, \ldots, e_{i,j}\}$ is the set of edges, and the number of edges is $$\frac{N(N-1)}{2},$$

and $e_{i,j}$ stands for the connectivity between nodes $p_i$ and $p_j$; $W=\{w_{1,2}, w_{1,3}, \ldots, w_{i,j}\}$ is the set of weights of the edges, $w_{i,j}$ represents the coupling strength between nodes $p_i$ and $p_j$; $\Theta$ is the active region of the nodes, representing the dynamic constraints on the nodes in the network. Model $\Theta$ as a smooth bounded surface:

$$F_\Theta(x, y, z) = 0, \quad \text{s.t.} \ \forall \ (x, y) \in \Omega$$

Where, $\Omega$ is the boundary of the representation of the slip surface. Consider a continuous time dynamic network with N nodes on $\Theta$ with a node state equation of the form:

$$\dot{X}_i = A_i X_i + B_i U_i$$

Where, $X_i \in R^m$ denotes the state vector of node $p_i$, $R^m$ denotes the vector space consisting of m-dimensional real numbers R, $U_i \in R^q$ is the input vector, $R^q$ denotes the vector space consisting of q-dimensional real numbers R, $A_i$ denotes the dynamics matrix, $B_i$ denotes the input matrix. Based on the node state equation, the output vector of node $p_i$ can be obtained:

$$Y_i = f_i(X_i)$$

Where, $f_i$ denotes the output function of the node. Then the weight function between nodes $p_i$ and $p_j$ is:

$$w_{ij} = F(Y_i, Y_j)$$

Where, F denotes the weight function between the nodes. A Gaussian function is used here to reveal the static properties between nodes:

$$S_{sta} = C_a \cdot \exp\left(-\frac{(x-x_0)^2}{a_x^2} - \frac{(y-y_0)^2}{b_y^2}\right)$$

Where, $S_{sta}$ denotes the static field strength, $C_\alpha$ denotes the field strength coefficients, $x_0$ and $y_0$ denote the coordinates of the risk center $O(x_0, y_0)$, and $a_x$ and $b_y$ denote the vehicle appearance coefficients, specifically the length and width, respectively. The safety field is characterized by shape anisotropy:

$$\varepsilon = \frac{a_x^2 - b_y^2}{a_x^2 + b_y^2} = \frac{\phi^2 - 1}{\phi^2 + 1}$$

$$\phi = a_x/b_y = l_v/w_v$$

Where, $\phi$ is the aspect ratio, $l_v$ denotes the vehicle length, and $w_v$ denotes the vehicle width. The safety field is delineated by a series of isofields, and the top view projection is the region covered by a series of ellipses, with the region covered by the smallest center ellipse being the core domain, the region between the smallest center ellipse and the second ellipse being the limited domain, and the region between the second ellipse and the largest ellipse being the extended domain. The size and shape of the region are determined by the isofield lines, are related to the vehicle shape and motion state and are described based on a Gaussian function. The direction of the safety field is aligned with the direction of vehicle motion.

When the vehicle is in motion, the risk center $O(x_0, y_0)$ of the safety field will be transferred to a new risk center $O'(x'_0, y'_0)$:

$$\begin{cases} x'_0 = x_0 + k_v|\vec{v}| \cos\beta \\ y'_0 = y_0 + k_v|\vec{v}| \sin\beta \end{cases}$$

Where, $k_v$ denotes the moderating factor and $k_v \ni \{(-1, 0) \cup (0,1)\}$, $k_v$'s positive or negative is related to the direction of motion, and $\beta$ denotes the angle of the transfer vector $k_v[\vec{v}]$ with the axes in the Cartesian coordinate system. A virtual vehicle, with length $l'_v$ and width $w'_v$, is formed under the risk center transfer. The dynamic safety field:

$$S_{dyn} = C_a \cdot \exp\left(-\frac{(x-x'_0)^2}{(a'_x)^2} - \frac{(y-y'_0)^2}{(b'_y)^2}\right)$$

Where, $S_{dyn}$ denotes the dynamic field strength and the new aspect ratio is denoted as $\phi'=a'_x/b'_y=l'_v/w'_v$. As the motion state of the vehicle changes, the shape of the Gaussian safety field changes, thus changing the three fields covered by the safety field: the core region, the limited region and the extended region.

The present disclosure categorizes risk perception into three layers on a planar scale based on different levels of human driving reaction time: the first cognitive domain, the second cognitive domain and the extra-domain space.

The first cognitive domain:

$$a'_x \leq s_{th1}$$

$$s_{th1} = t_{c1} \cdot v_e$$

The second cognitive domain:

$$s_{th1} < a'_x \leq s_{th2}$$

$$s_{th2} = t_{c2} \cdot v_e$$

The extra-domain space:

$$s_{th2} < a'_x$$

Where, $s_{th1}$ denotes the first cognitive domain threshold, obtained from the human driving the first reaction time $t_{c1}$ and the maximum approach speed $v_e$ of the other nodes relative to the self-vehicle. $s_{th2}$ denotes the second cognitive domain threshold, obtained from the human driving the second reaction time $t_{c2}$ and the maximum approach speed $v_e$ of the other nodes relative to the self-vehicle.

Establish a risk perception function between nodes under a variable safety field model:

$$\text{Risk}(p_i, p_j) = |\vec{S_{i,j}}|\exp(-k_c|\vec{v_j}|\cos\theta_{i,j})$$

Where, $|\vec{S_{i,j}}|$ denotes the field strength of node $p_i$ at node $p_j$, $k_c$ denotes the risk-adjustment cognitive coefficient, $|\vec{v_j}|$ denotes the scalar velocity of node $p_j$, and $\theta_{i,j}$ denotes the angle (positive in the clockwise direction) between the velocity vector $\vec{v_j}$ of node $p_j$ and the field strength vector $\vec{S_{i,j}}$. The risk value $\text{Risk}(p_i, p_j)$, obtained through the risk perception function, indicates the coupling strength between the nodes, and the higher the risk value, the higher the coupling strength, implying the higher correlation between the nodes.

The activation function is configured to map the risk value, Activate(Risk) represents different activation functions according to different driving suggestions, and the mapped risk value will be used as the basis for guiding the output strategy of the reinforcement learning module:

$$\text{Activate}_{go}(\text{Risk}) = \frac{4}{(1+\exp(-300/\text{Risk}))-1}$$

$$\text{Activate}_{stop}(\text{Risk}) = \frac{4}{(1+\exp(-0.2*\text{Risk}))-1}$$

Where, $\text{Activate}_{go}(\text{Risk})$ denotes the activation function when the suggestion is forward, $\text{Activate}_{stop}(\text{Risk})$ denotes the activation function when the suggestion is stop, and Risk denotes the current risk value of the self-vehicle. The dynamic risk suggestion $B_{risk}$:

$$B_{risk} = B(\text{Activate}_{go}(\text{Risk}), \beta_{go}), \text{go}$$

$$B_{risk} = B(\alpha_{stop}, \text{Activate}_{stop}(\text{Risk})), \text{stop}$$

Where, B denotes the beta distribution with $\alpha_{stop} = \beta_{go} = 1$.

The reinforcement learning module is configured to integrate the state quantities output from the measurement encoder and the image encoder, output the corresponding strategies according to the integrated network inputs, and interact with the environment to generate experience stored in the local replay buffer in the federated learning module. When the number of samples reaches a certain threshold, a batch of sample is taken from the local replay buffer for training, and finally the parameters of the trained neural network are uploaded to the federated learning module.

The interaction environment is a CARLA simulator, realizes vehicle control by inputting the control quantities of steering, throttle and brake, where steering $\in [-1,1]$, throttle $\in [0,1]$ and brake $\in [0,1]$. Based on CARLA's control method, the reinforcement learning action space $\in [-1, 1]^2$, are categorized into steering wheel corner and throttle brake. When outputting the throttle brake, $[-1,0]$ denotes the brake and $[0,1]$ denotes the throttle. The present disclosure outputs the two parameters of the beta distribution by reinforcement learning, and then obtains the policy actions by sampling:

$$\text{Beta} = B(\alpha, \beta), \alpha, \beta > 0$$

In contrast to Gaussian distributions, are commonly used for model-free reinforcement learning, beta distributions are bounded and do not require mandatory constraints.

The interaction process produces an experience, described by a tuple, containing a previous moment state quantity, an action, a reward function, a next moment state quantity, and a dynamic driving suggestion. Calculate the weighted reward function with the mapped risk value as a weight for termination state-related reward:

$$r = r_{speed} + r_{position} + r_{action} + \text{Activate}(\text{Risk}) * r_{terminal}$$

$$r_{speed} = \frac{1 - |v - v_{desire}|}{v_{max}}$$

$$r_{position} = -0.5 * \Delta d - \Delta \theta$$

Where, $r_{speed}$ denotes the speed-related reward function, $r_{position}$ denotes the position-related reward function, $r_{action}$ denotes the action-related reward function, $r_{terminal}$ denotes the termination state-related reward function, v denotes the vehicle speed, $v_{desire}$ denotes the desired speed, and $v_{max}=6$ m/s denotes the maximum speed. $\Delta d$ denotes the vehicle lateral distance from the desired path, and $\Delta \theta$ denotes the angle between the vehicle traveling direction and the tangent line of the desired path. Table 1 describes the values of $r_{action}$ and $r_{terminal}$ in detail, where $\Delta$steering denotes the amount of steering wheel angle change in two frames.

TABLE 1

| Reward | Condition | Value |
| --- | --- | --- |
| $r_{action}$ | $\Delta$steering $\geq 0.01$ | $-1 - v$ |
| $r_{terminal}$ | Run red light | $-1 - v$ |
| | Run stop sign | $-1 - v$ |
| | Collision | $-1 - v$ |
| | Route deviation | $-1$ |
| | Blocked | $-1$ |

The training process of the reinforcement learning module performs parameter updating through the following loss function:

$$\theta_{k+1} = \arg\max_\theta \underset{\tau \sim \pi_{\theta_k}}{E} [\mathcal{L}_{ppo} + \mathcal{L}_{exp} + \mathcal{L}_{risk}]$$

$$\mathcal{L}_{exp} = -\lambda_{exp} * H(\pi_\theta(\cdot \mid i_{RL}, m_{RL}))$$

$$H(\pi_\theta) = -KL(\pi_\theta \| \mathcal{U}(-1, 1))$$

$$\mathcal{L}_{risk} = \lambda_{risk} * \mathbb{1}_{\{T-N_z+1, \ldots, T\}}(k)$$

$$* KL(\pi_\theta(\cdot \mid i_{RL,k}, m_{RL,k})) \| B_{risk}$$

Where, $\mathcal{L}_{ppo}$ denotes the clipped policy gradient loss with advantages estimated using generalized advantage estimation. $\mathcal{L}_{exp}$ denotes the maximum entropy loss, $H(\pi_\theta(\cdot \mid i_{RL}, m_{RL}))$ denotes the entropy of the policy $\pi_\theta$ under the image input $i_{RL}$ and the measurement input $m_{RL}$, and $\mathcal{U}(-1, 1)$ denotes the uniform distribution. $\mathcal{L}_{exp}$ encourage the agent to explore by converging the action distribution to a uniform distribution, $\lambda_{exp}$ denotes the weight of the maximum entropy loss. $\mathcal{L}_{risk}$ denotes the loss based on the dynamic risk suggestions, and $\mathbb{1}_{\{T-N_z+1, \ldots, T\}}(k)$ denotes the calculation of the KL-divergence of the strategy output by the driving subject $N_z=100$ steps before the termination state and the dynamic driving suggestions to realize the guidance of the agent, and $\lambda_{risk}$ denotes the weight of the dynamic suggestions loss.

The federated learning module is configured to receive the neural network parameters uploaded by the reinforcement learning module of each agent, and to aggregate the global parameters based on the plurality of neural network parameters, and finally to send the global parameters to each agent until the network converges. The global parameter aggregation is performed by the following equation:

$$\phi_m^* = \frac{1}{N}\sum_n \phi_m^n$$

Where, $\phi_m^*$ denotes the global parameters at time m, N denotes the number of agents, and $\phi_m^n$ denotes the neural network parameters at time m of the nth agent.

Overall, the FLDPPO algorithm realizes the combination of rule-based complex network cognition and end-to-end FRL by designing the loss function. Moreover, using the multi-agent FRL architecture, the model is trained by parameter aggregation. The multi-agent FRL architecture accelerates the network convergence and reduces the communication consumption on the basis of protecting the privacy of the vehicle, and realizes the balance between high robustness and sample-efficient of the model.

The technical solution of the complex network cognition based FRL end-to-end automatic driving control method of the present disclosure includes the following steps:

Step 1: Build an urban dense traffic simulation environment in the CARLA simulator. The simulation environment contains the driving subject, the traffic participants, and the transportation infrastructure.

The driving subject is a plurality of agents, modeled as Markov decision processes, respectively, and using a reinforcement learning module for steering wheel, throttle and brake control. The Markov decision process is described by the tuple (S, A, P, R, $\gamma$). S denotes the state set, corresponding to the state quantities acquired by the measurement encoder and the image encoder in the present disclosure, and contains the steering wheel angle, the throttle, the brake, the gear, the lateral and longitudinal speeds, and the 15-channel semantic BEV; A denotes the action set, corresponding to the steering wheel, the throttle, and the brake control quantities of the driving subject in the present disclosure; P denotes the state transfer equation p: S×A→P(S), for each state-action pair (s, a)∈ S×A there is a probability distribution p(·|s, a) of entering a new state after adopting an action a, in state s; R denotes the reward function R: S×S×A→R, R($s_{t+1}$, $s_t$, $a_t$) denotes the reward obtained after entering a new state $s_{t+1}$ from the original state $s_t$, in the present disclosure, the goodness of performing the action is defined by the reward function; $\gamma$ denotes the discount factor, $\gamma \in$ [0, 1], is configured to compute the cumulative reward $\eta(\pi_\theta)=\Sigma_{i=0}^{T}\gamma^i r_i$, where T denotes the current moment, $\gamma^i$ denotes the discount factor of moment i, and $r_i$ denotes the immediate reward of moment i. The solution to the Markov decision process is to find a strategy $\pi$: S→A such that the cumulative reward is maximized $\pi^*:=\text{argmax}_\theta \eta(\pi_\theta)$. In the present disclosure, the reinforcement learning module integrates the implicit state quantities output by the measurement encoder and the image encoder and outputs the corresponding optimal control policy;

Step 2: Build a complex network cognition module to model the driving situation of the driving subject, establish a complex network model, and output dynamic driving suggestions based on state quantities provided by the measurement encoder through an activation function. The complex network model represents the dynamic relationship between nodes within the field range through a variable Gaussian safety field based on risk center transfer. The nodes contain driving subjects, traffic participants and transportation infrastructure.

Step 3: Construct an end-to-end neural network, comprising 2 fully connected layers used by the measurement encoder, 6 convolutional layers used by the image encoder and 6 fully connected layers used by the reinforcement learning module. The neural network has two output heads, action head and value head. The action head outputs two parameters of the beta distribution and the value head outputs the value of the action.

Step 4: The driving subjects interact with the CARLA simulation environment and the experiences are stored in their respective local replay buffers. When the number of samples reaches a certain threshold, the samples are sampled from the respective local replay buffer according to the mini-batch, and then the neural network parameters are updated according to the designed loss function.

Step 5: The neural network parameters corresponding to each driving subject are uploaded to the federated learning module. The federated learning module aggregates the global parameters based on the multiple neural network parameters according to the aggregation interval and sends global parameters to each agent until the network converges.

Preferably, in step 1, the traffic participants comprise other vehicles and pedestrians, the number of other vehicles is 100 and the number of pedestrians is 250, and are controlled using CARLA's roaming model.

Preferably, in step 1, the transportation infrastructure contains traffic lights and traffic signs (stops), represented in the image encoder input using a 4-frame semantic BEV.

Preferably, in step 2, the complex network cognition module takes different activation functions according to different driving suggestions:

$$\text{Activate}_{go}(\text{Risk}) = \frac{4}{(1+\exp(-300/\text{Risk}))-1}$$

$$\text{Activate}_{stop}(\text{Risk}) = \frac{4}{(1+\exp(-0.2*\text{Risk}))-1}$$

Preferably, in step 2, the dynamic driving suggestions are represented using a beta distribution:

$$B_{risk} = B(\text{Activate}_{go}(\text{Risk}), \beta), \text{ go}$$

$$B_{risk} = B(\alpha, \text{Activate}_{stop}(\text{Risk})), \text{ stop}$$

Preferably, in step 3, the neural network of the measurement encoder uses the Relu activation function for the 2 fully connected layers, the neural network of the image encoder uses the Relu activation function for the 5 convolutional layers except for the last convolutional layer that spreads the state volume without using the activation function, the neural network of the reinforcement learning module uses the Softplus activation function for the last layer of the action head, the last layer of the value head does not use the activation function. The other fully connected layers use Relu activation function.

Preferably, in step 4, the parameters used in the training process, the learning rate is 0.00001; the total step size is 12288; the mini-batch sampling is 256; the loss function weights $\lambda_{ppo}$, $\lambda_{exp}$, and $\lambda_{risk}$ are 0.5, 0.01, and 0.05, respectively; the range of the PPO clip is 0.2; and the parameter $\gamma$ for the generalized advantage estimation is 0.99 and $\lambda$ is 0.9.

Preferably, in step 4, the loss function used for training uses the loss $\mathcal{L}_{risk}$ based on the dynamic risk suggestions. The guidance of the agent is realized by calculating the KL-divergence of the strategy and the dynamic driving suggestions output by the driving subject $N_z=100$ steps before the termination state.

Preferably, in step 5, the federated learning module is a multi-agent framework that uses a local replay buffer architecture between agents.

Preferably, in step 5, the aggregation process uses a parameter-averaged aggregation method with an aggregation interval of 256.

The present disclosure also proposes a vehicular device, the vehicular device being capable of executing the contents of the complex network cognition-based FRL end-to-end autonomous driving control system, or complex network cognition-based FRL end-to-end autonomous driving control method.

The Present Disclosure has Advantages as Follows:

(1) The present disclosure proposes FLDPPO, a complex network cognition-based FRL end-to-end automated driving algorithm framework, to realize the combination of rule-based complex network cognition and end-to-end FRL by designing a loss function. FLDPPO uses dynamic driving suggestions to guide agents to learn the rules, enabling agents to cope with complex urban driving environments and dense traffic scenarios.

(2) The proposed framework of the present disclosure uses a multi-agent FRL architecture to train models by the method of parameter aggregation. The multi-agent FRL architecture accelerates network convergence, reduces communication consumption, and achieves a balance between sampling efficiency and high robustness of the model while protecting the privacy of the vehicle side.

DETAILED DESCRIPTION OF THE EMBODIMENTS

The technical solution of the present disclosure is described in detail below in conjunction with the drawings, but is not limited to the contents of the present disclosure.

Figure 1:
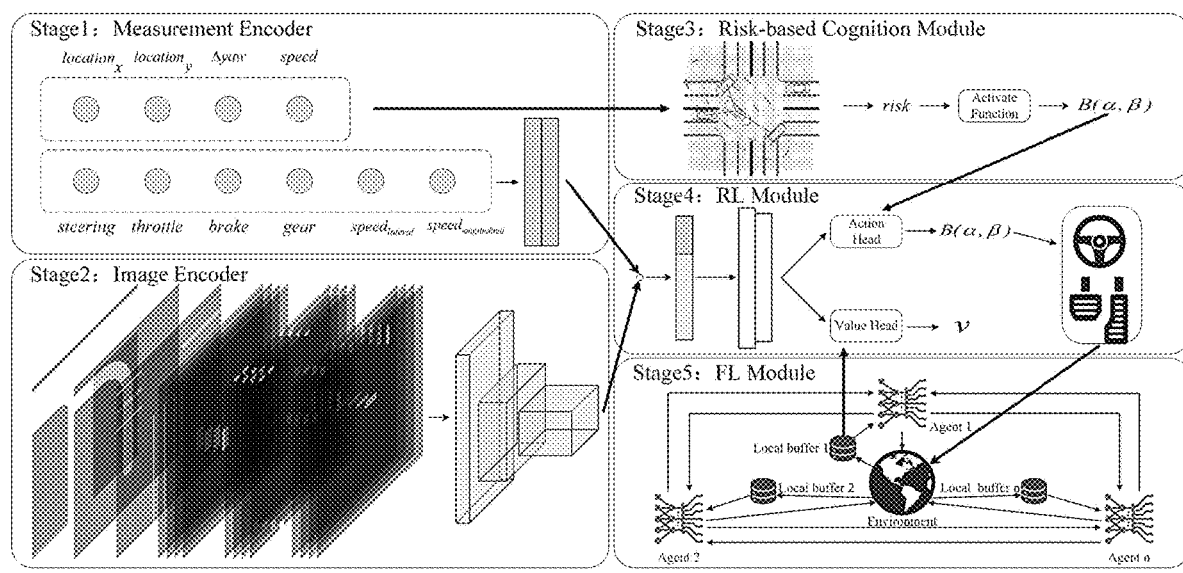
FIG. 1 is the complex network cognition based FRL framework.
Figure 2A:
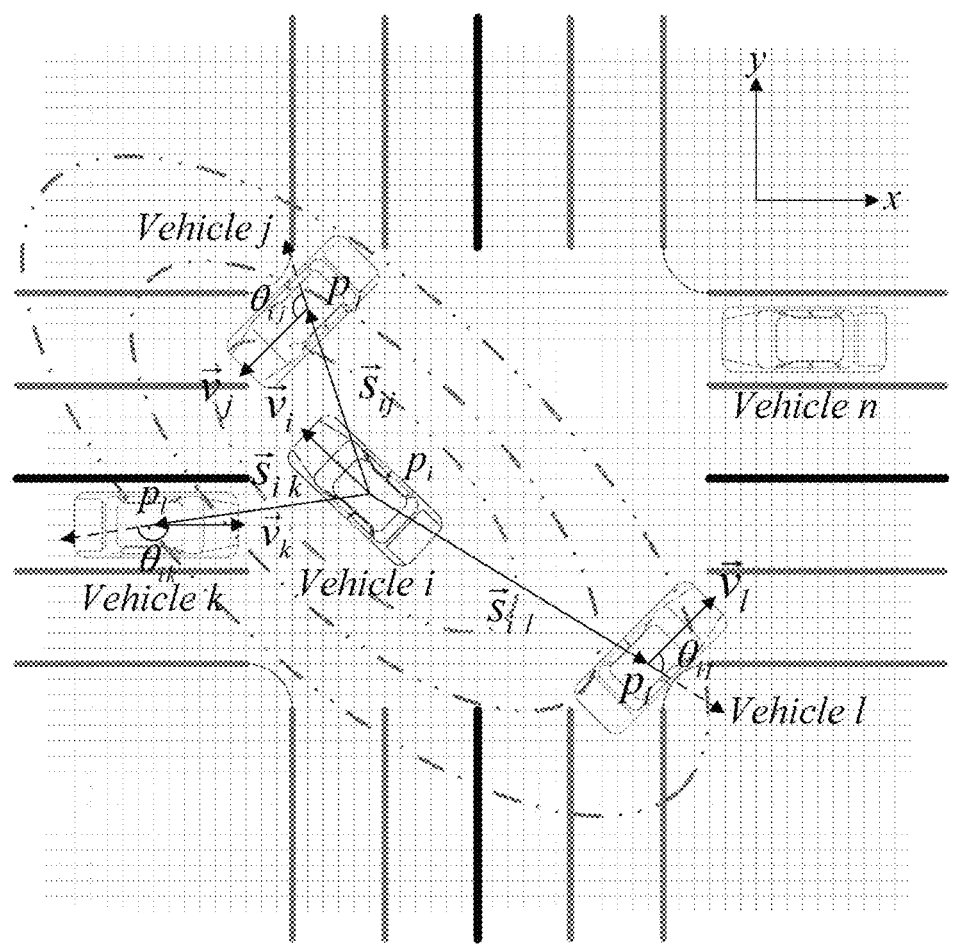
FIGS. 2A-2D show the schematic of risk perception based on dynamic safety field.
Figure 2B:
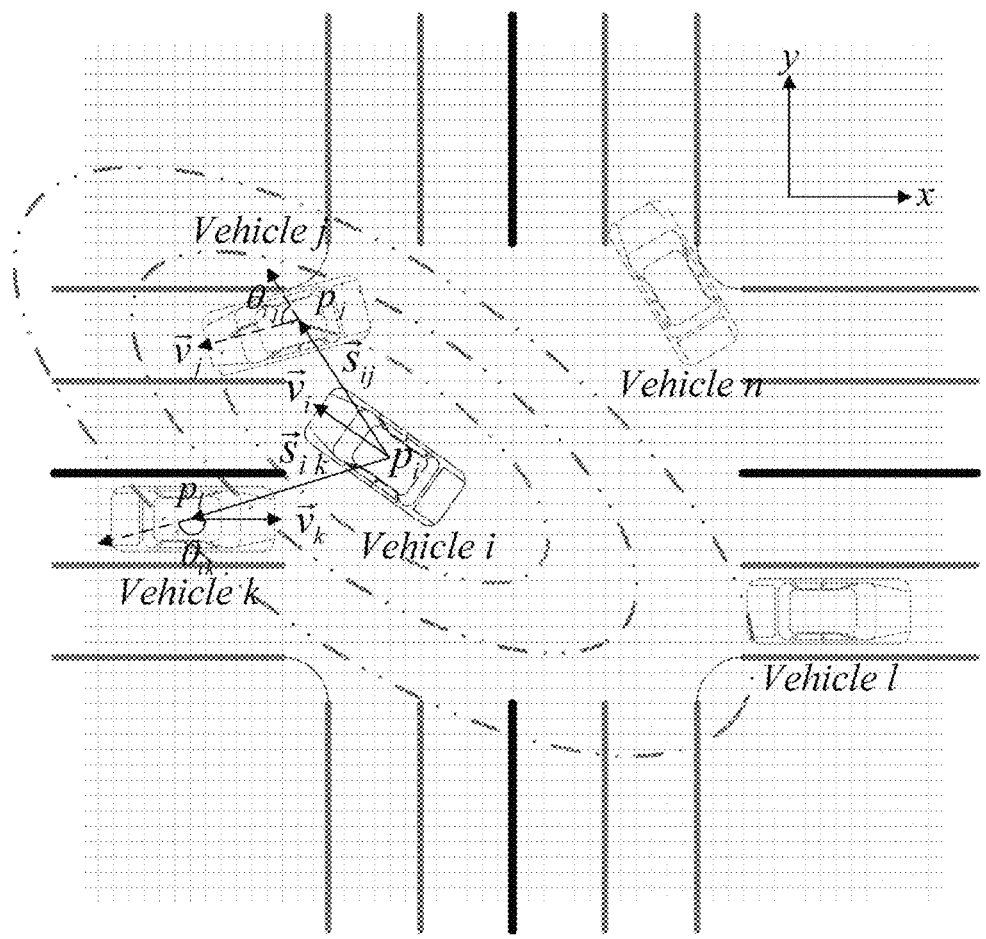
Figure 2C:
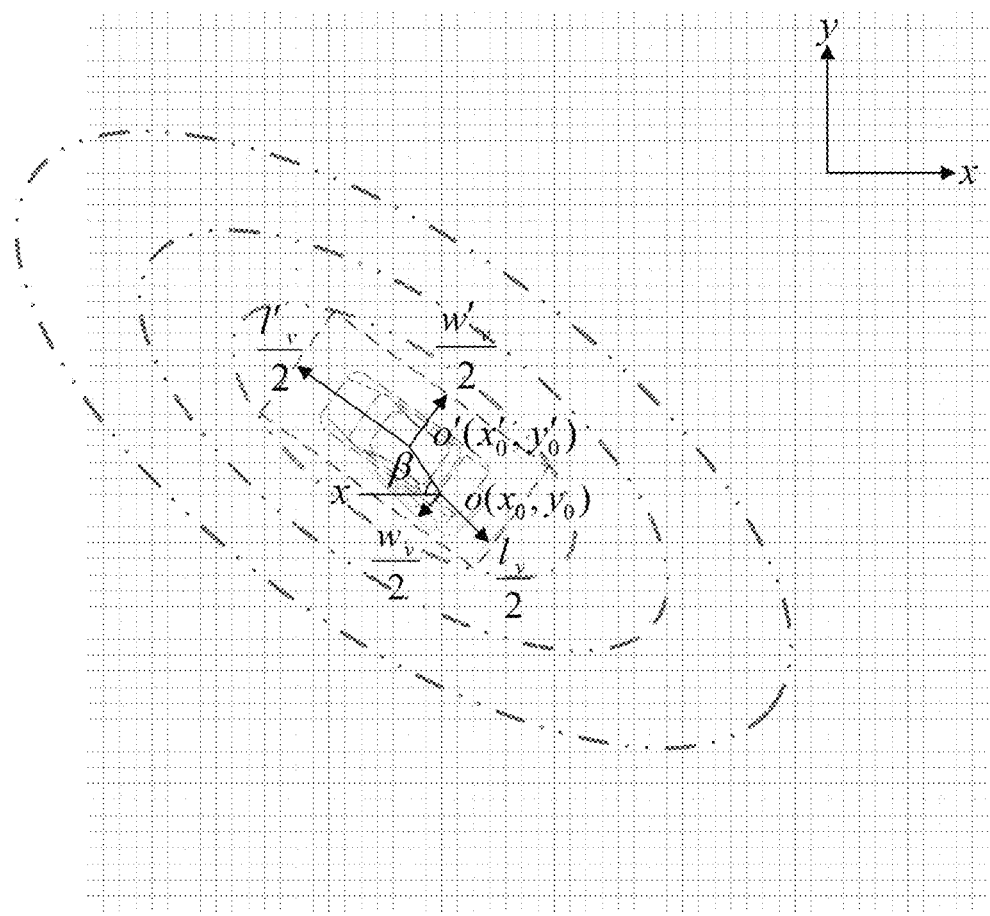
Figure 2D:
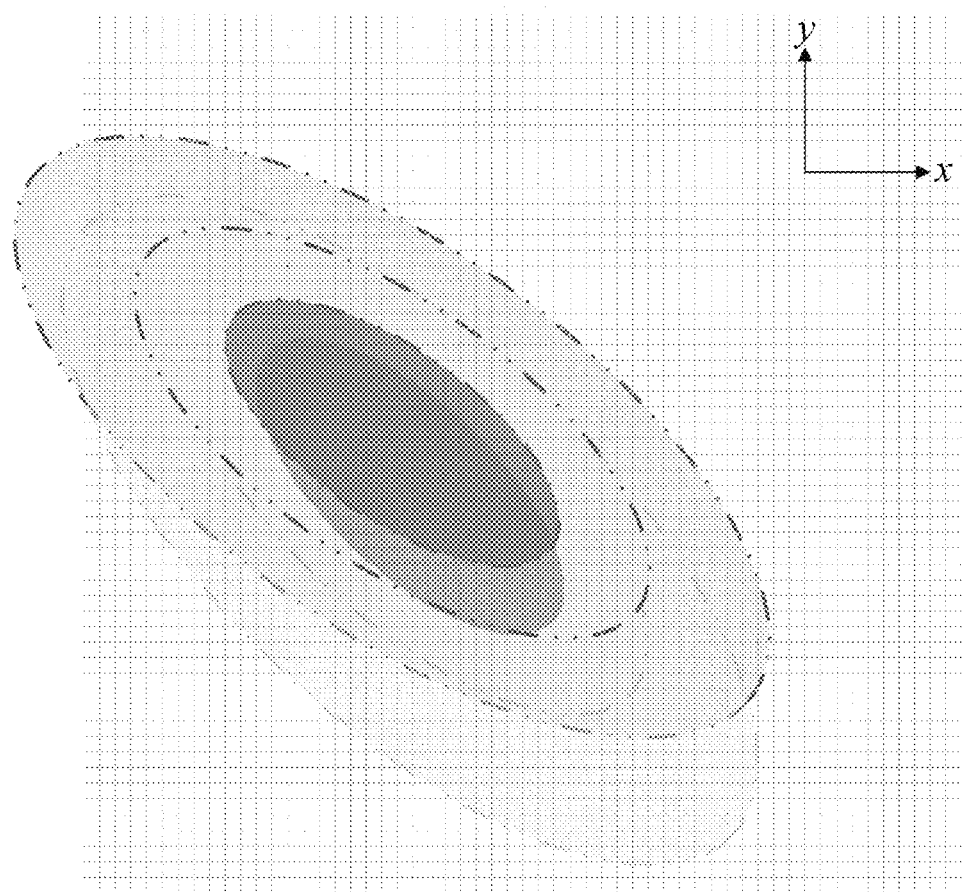
Figure 6:
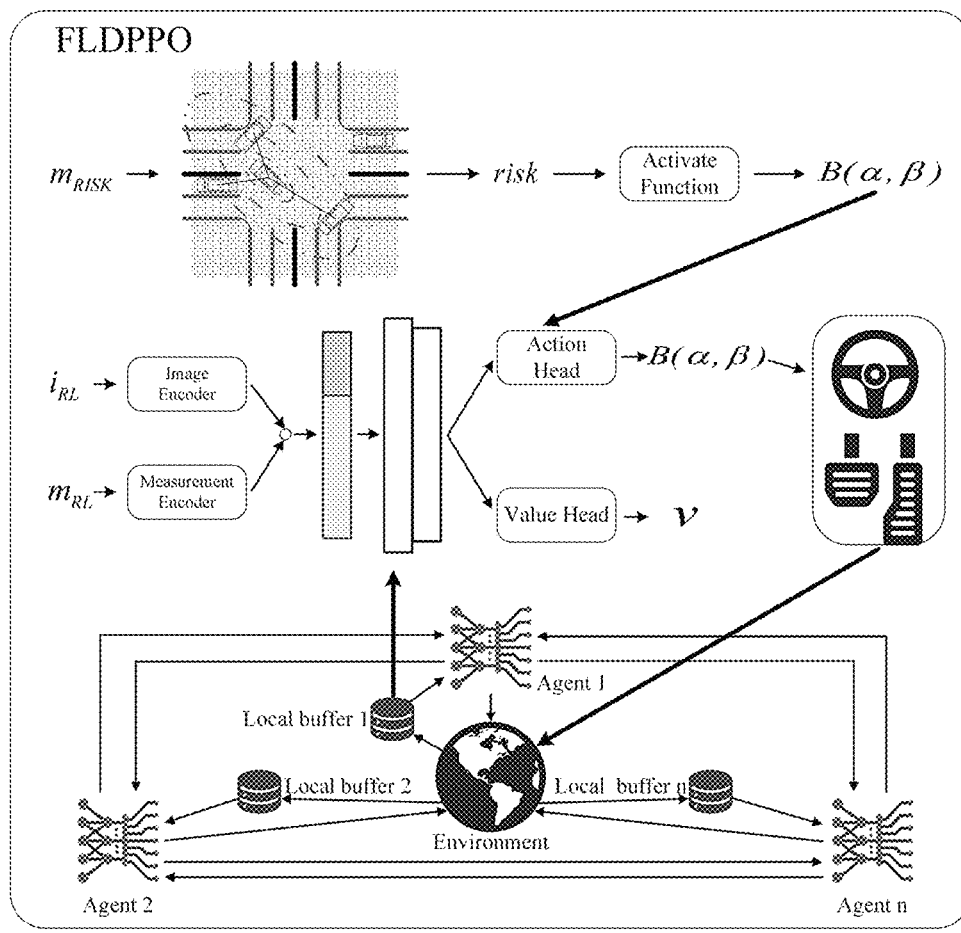
FIG. 6 is the diagram of the FLDPPO framework.

The present disclosure provides a complex network cognition-based FRL end-to-end algorithmic framework that enables autonomous driving under dense urban traffic, specifically including the following steps:

(1) The framework of FRL algorithm based on complex network cognition is built in CARLA simulator, as shown in FIG. 1 and FIG. 6. The framework includes a measurement encoder, an image encoder, a complex network cognition module, a reinforcement learning module, and a federated learning module. The measurement encoder is configured to obtain x-coordinate, y-coordinate, heading angle change and speed of the driving agent. The cognition state quantities are handed over to the complex network cognition module as input. The measurement encoder is also used to obtain steering wheel angle, throttle, brake, gear, lateral speed and longitudinal speed. The RL state quantities are given to the reinforcement learning module as part of the inputs after extracting features from the two-layer fully connected network. The image encoder used a 15-channel semantic BEV, $i_{RL} \in [0, 1]^{192*192*15}$. Where, 192 is in pixels and the BEV used is 5 px/m. The 15 channels contain a drivable domain, a desired path, a road edge, 4 frames of other vehicles, 4 frames of pedestrians, and 4 frames of traffic signs. The desired path is calculated using the A* algorithm. The semantic BEV is extracted by multilayer convolutional layers to extract implicit features and then passed to the reinforcement learning module as another part of the inputs.

(2) Model the driving situation of the driving subject, as shown in FIGS. 2A-2D, a dynamic complex network model is constructed with traffic participants and road infrastructure as nodes:

$$G_t = (P, E, W, \Theta)_t$$

Where, $G_t$ denotes the dynamic complex network at the moment t, $P=\{p_1, p_2, \ldots, p_N\}$ is the set of nodes, and the number of nodes is N; $E=\{e_{1,2}, e_{1,3}, \ldots, e_{i,j}\}$ is the set of edges, and the number of edges is $$\frac{N(N-1)}{2},$$

and $e_{i,j}$ stands for the connectivity between nodes $p_i$ and $p_j$; $W=\{w_{1,2}, w_{1,3}, \ldots, w_{i,j}\}$ is the set of weights of the edges, $w_{i,j}$ represents the coupling strength between nodes $p_i$ and $p_j$; $\Theta$ is the active region of the nodes, representing the dynamic constraints on the nodes in the network. Model $\Theta$ as a smooth bounded surface:

$$F_\Theta(x, y, z) = 0,$$
$$\text{s.t. } \forall (x, y) \in \Omega$$

Where, $\Omega$ is the boundary of the representation of the slip surface. Consider a continuous time dynamic network with N nodes on $\Theta$ with a node state equation of the form:

$$\dot{X}_i = A_i X_i + B_i U_i$$

Where, $X_i \in \mathbb{R}^m$ denotes the state vector of node $p_i$, $\mathbb{R}^m$ denotes the vector space consisting of m-dimensional real numbers R, $U_i \in \mathbb{R}^q$ is the input vector, $\mathbb{R}^q$ denotes the vector space consisting of q-dimensional real numbers R, $A_i$ denotes the dynamics matrix, $B_i$ denotes the input matrix. Based on the node state equation, the output vector of node $p_i$ can be obtained:

$$Y_i = f_i(X_i)$$

Where, $f_i$ denotes the output function of the node. Then the weight function between nodes $p_i$ and $p_j$ is:

$$w_{ij} = F(Y_i, Y_j)$$

Where, F denotes the weight function between the nodes. The present disclosure uses a Gaussian function to reveal the static properties between nodes:

$$S_{sta} = C_a \cdot \exp\left(-\frac{(x-x_0)^2}{a_x^2} - \frac{(y-y_0)^2}{b_y^2}\right)$$

Where, $S_{sta}$ denotes the static field strength, $C_a$ denotes the field strength coefficients, $x_0$ and $y_0$ denote the coordinates of the risk center $O(x_0, y_0)$, and $a_x$ and $b_y$ denote the vehicle appearance coefficients, respectively. The safety field is characterized by shape anisotropy:

$$\varepsilon = \frac{a_x^2 - b_y^2}{a_x^2 + b_y^2} = \frac{\phi^2 - 1}{\phi^2 + 1}$$

$$\phi = a_x/b_y = l_v/w_v$$

Where, $\phi$ is the aspect ratio, $l_v$ denotes the vehicle length, and $w_v$ denotes the vehicle width. The safety field is delineated by a series of isofields, and the top view projection is the region covered by a series of ellipses as shown in FIGS. 2A-2D, with the region covered by the smallest center ellipse being the core domain, the region between the smallest center ellipse and the second ellipse being the limited domain, and the region between the second ellipse and the largest ellipse being the extended domain. The size and shape of the region are determined by the isofield lines, are related to the vehicle shape and motion state and are described based on a Gaussian function. The direction of the safety field is aligned with the direction of vehicle motion.

When the vehicle is in motion, the risk center $O(x_0, y_0)$ of the safety field will be transferred to a new risk center $O'(x'_0, y'_0)$:

$$\begin{cases} x'_0 = x_0 + k_v|\vec{v}|\cos\beta \\ y'_0 = y_0 + k_v|\vec{v}|\sin\beta \end{cases}$$

Where, $k_v$ denotes the moderating factor and $k_v \ni \{(-1, 0) \cup (0,1)\}$, $k_v$'s positive or negative is related to the direction of motion, and $\beta$ denotes the angle of the transfer vector $k_v|\vec{v}|$ with the axes in the Cartesian coordinate system. A virtual vehicle, with length $l'_v$ and width $w'_v$, is formed under the risk center transfer. The dynamic safety field:

$$S_{dyn} = C_a \cdot \exp\left(-\frac{(x-x'_0)^2}{(a'_x)^2} - \frac{(y-y'_0)^2}{(b'_y)^2}\right)$$

Where, $S_{dyn}$ denotes the dynamic field strength and the new aspect ratio is denoted as $\phi' = a'_x/b'_y = l'_v/w'_v$. As the motion state of the vehicle changes, the shape of the Gaussian safety field changes, thus changing the three fields covered by the safety field: the core region, the limited region and the extended region.

The present disclosure categorizes risk perception into three layers on a planar scale based on different levels of human driving reaction time: the first cognitive domain, the second cognitive domain and the extra-domain space.

The first cognitive domain:

$$a'_x \leq s_{th1}$$

$$s_{th1} = t_{c1} \cdot v_e$$

The second cognitive domain:

$$s_{th1} < a'_x \leq s_{th2}$$

$$s_{th2} = t_{c2} \cdot v_e$$

The extra-domain space:

$$s_{th2} < a'_x$$

Where, $s_{th1}$ denotes the first cognitive domain threshold, obtained from the human driving the first reaction time $t_{c1}$ and the maximum approach speed $v_e$ of the other nodes relative to the self-vehicle. $s_{th2}$ denotes the second cognitive domain threshold, obtained from the human driving the second reaction time $t_{c2}$ and the maximum approach speed $v_e$ of the other nodes relative to the self-vehicle.

Establish a risk perception function between nodes under a variable safety field model:

$$\text{Risk}(p_i, p_j) = |\vec{S_{ij}}| \exp\left(-k_c|\vec{v_j}|\cos\theta_{i,j}\right)$$

Where, $|\vec{S_{i,j}}|$ denotes the field strength of node $p_i$ at node $p_j$, $k_c$ denotes the risk-adjustment cognitive coefficient, $|\vec{v_j}|$ denotes the scalar velocity of node $p_j$, and $\theta_{i,j}$ denotes the angle (positive in the clockwise direction) between the velocity vector $\vec{v_j}$ of node $p_j$ and the field strength vector $\vec{S_{i,j}}$. The risk value $\text{Risk}(p_i, p_j)$, obtained through the risk perception function, indicates the coupling strength between the nodes, and the higher the risk value, the higher the coupling strength, implying the higher correlation between the nodes.

The activation function is configured to map the risk value, Activate(Risk) represents different activation functions according to different driving suggestions, and the mapped risk value will be used as the basis for guiding the output strategy of the reinforcement learning module:

$$\text{Activate}_{go}(\text{Risk}) = \frac{4}{(1 + \exp(-300/\text{Risk})) - 1}$$

-continued $$\text{Activate}_{stop}(\text{Risk}) = \frac{4}{(1 + \exp(-0.2 * \text{Risk})) - 1}$$

Where, $\text{Activate}_{go}(\text{Risk})$ denotes the activation function when the suggestion is forward, $\text{Activate}_{stop}(\text{Risk})$ denotes the activation function when the suggestion is stop, and Risk denotes the current risk value of the self-vehicle. The dynamic risk suggestion $B_{risk}$:

$$B_{risk} = B(\text{Activate}_{go}(\text{Risk}), \beta_{go}), \text{go}$$

$$B_{risk} = B(\alpha_{stop}, \text{Activate}_{stop}(\text{Risk})), \text{stop}$$

Where, B denotes the beta distribution with $\alpha_{stop} = \beta_{go} = 1$.

(3) Construct the reinforcement learning model of the driving subject. Based on CARLA's control method, the reinforcement learning action space $\in [-1, 1]^2$, are categorized into steering wheel corner and throttle brake. When outputting the throttle brake, [−1,0] denotes the brake and [0,1] denotes the throttle. The present disclosure outputs the two parameters of the beta distribution by reinforcement learning, and then obtains the policy actions by sampling:

$$\text{Beta} = B(\alpha, \beta), \alpha, \beta > 0$$

In contrast to Gaussian distributions, are commonly used for model-free reinforcement learning, beta distributions are bounded and do not require mandatory constraints.

Figure 3:
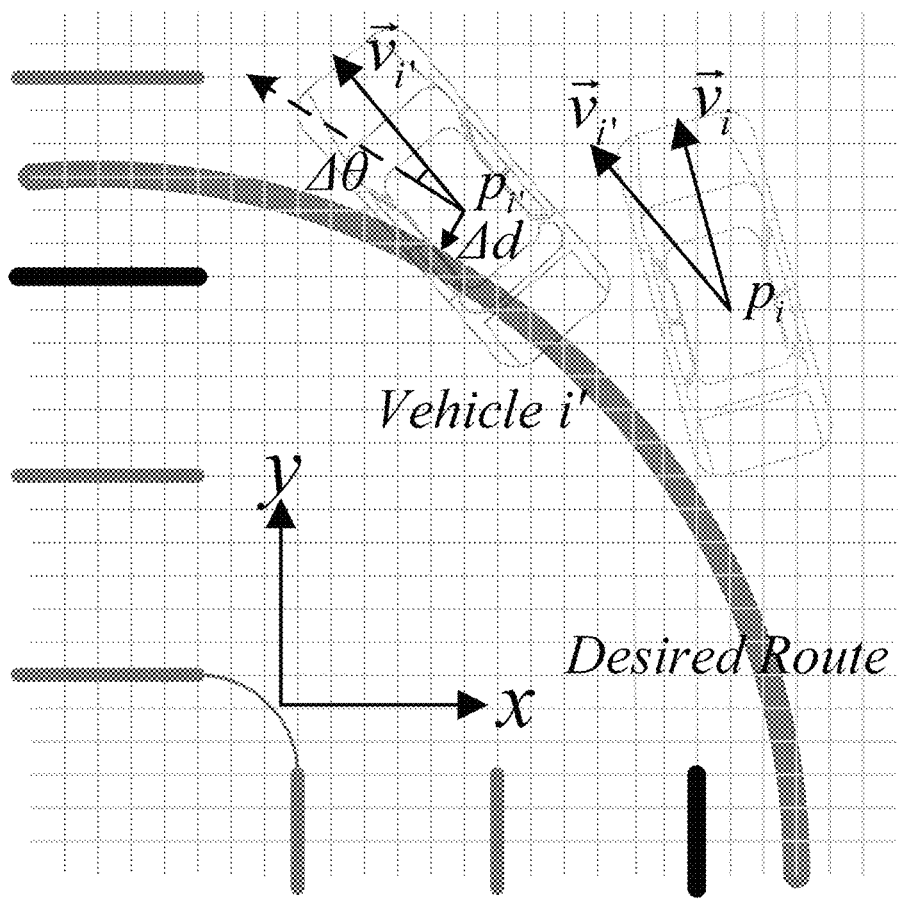
FIG. 3 is the schematic of the reward function.

The reward function setting, as shown in FIG. 3, considers from four aspects: velocity, coordinates, action and termination state. Calculate the weighted reward function with the mapped risk value as a weight for termination state-related reward:

$$r = r_{speed} + r_{position} + r_{action} + \text{Activate}(\text{Risk}) * r_{terminal}$$

$$r_{speed} = \frac{1 - |v - v_{desire}|}{v_{max}}$$

$$r_{position} = -0.5 * \Delta d - \Delta \theta$$

Where, $r_{speed}$ denotes the speed-related reward function, $r_{position}$ denotes the position-related reward function, $r_{action}$ denotes the action-related reward function, $r_{terminal}$ denotes the termination state-related reward function, v denotes the vehicle speed, $v_{desire}$ denotes the desired speed, and $v_{max}=6$ m/s denotes the maximum speed. $\Delta d$ denotes the vehicle lateral distance from the desired path, and $\Delta \theta$ denotes the angle between the vehicle traveling direction and the tangent line of the desired path. Table 1 describes the values of $r_{action}$ and $r_{terminal}$ in detail, where $\Delta$steering denotes the amount of steering wheel angle change in two frames.

Figure 4:
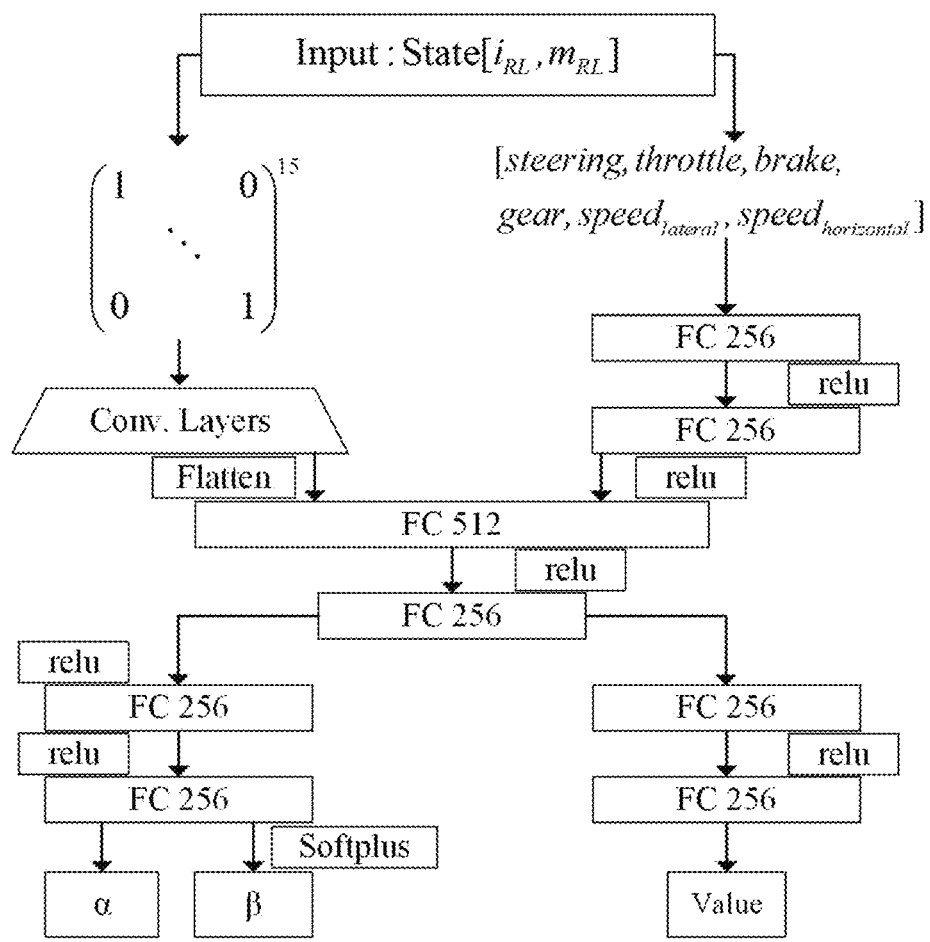
FIG. 4 is the schematic of the neural network.

Construct an end-to-end neural network, as shown in FIG. 4, comprising 2 fully connected layers used by the measurement encoder, 6 convolutional layers used by the image encoder and 6 fully connected layers used by the reinforcement learning module. The neural network has two output heads, action head and value head. The action head outputs two parameters of the beta distribution and the value head outputs the value of the action.

Figure 5:
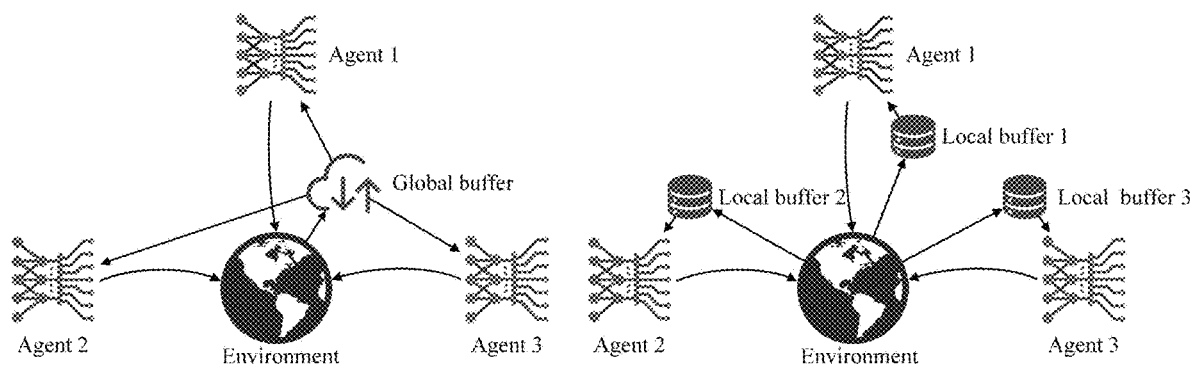
FIG. 5 is the diagram of the federated learning architecture.

(4) The driving subjects interact with the CARLA simulation environment and the experiences are stored in their respective local replay buffers. As shown in FIG. 5, when the number of samples reaches a certain threshold, the samples are sampled from the respective local replay buffer according to the mini-batch, and then the neural network parameters are updated according to the designed loss function:

$$\theta_{k+1} = \underset{\theta}{\arg\max} \underset{\tau \sim \pi_{\theta_k}}{E} [\mathcal{L}_{ppo} + \mathcal{L}_{exp} + \mathcal{L}_{risk}]$$

$$\mathcal{L}_{exp} = -\lambda_{exp} * H(\pi_\theta(\cdot \mid i_{RL}, m_{RL}))$$

$$H(\pi_\theta) = -KL(\pi_\theta \| \mathcal{U}(-1, 1))$$

$$\mathcal{L}_{risk} = \lambda_{risk} * \mathbb{1}_{\{T-N_z+1,\ldots,T\}}(k) * KL(\pi_\theta(\cdot \mid i_{RL,k}, m_{RL,k}) \| B_{risk})$$

Where, $\mathcal{L}_{ppo}$ denotes the clipped policy gradient loss with advantages estimated using generalized advantage estimation. $\mathcal{L}_{exp}$ denotes the maximum entropy loss, $H(\pi_\theta(\cdot | i_{RL}, m_{RL}))$ denotes the entropy of the policy $\pi_\theta$ under the image input $i_{RL}$ and the measurement input $m_{RL}$, and $\mathcal{U}(-1, 1)$ denotes the uniform distribution. $\mathcal{L}_{exp}$ encourage the agent to explore by converging the action distribution to a uniform distribution, $\lambda_{exp}$ denotes the weight of the maximum entropy loss. $\mathcal{L}_{risk}$ denotes the loss based on the dynamic risk suggestions, and $\mathbb{1}_{\{T-N_z+1,\ldots,T\}}(k)$ denotes the calculation of the KL-divergence of the strategy output by the driving subject $N_z=100$ steps before the termination state and the dynamic driving suggestions to realize the guidance of the agent, and $\lambda_{risk}$ denotes the weight of the dynamic suggestions loss.

(5) The federated learning module is configured to receive the neural network parameters uploaded by the reinforcement learning module of each agent, and to aggregate the global parameters based on the plurality of neural network parameters, and finally to send the global parameters to each agent until the network converges. The global parameter aggregation is performed by the following equation:

$$\phi_m^* = \frac{1}{N} \sum_n \phi_m^n$$

Where, $\phi_m^*$ denotes the global parameters at time m, N denotes the number of agents, and $\phi_m^n$ denotes the neural network parameters at time m of the nth agent.

Overall, the present disclosure proposes FLDPPO, a complex network cognition based FRL algorithmic framework for urban autonomous driving in dense traffic scenarios. The FLDPPO algorithm realizes the combination of rule-based complex network cognition and end-to-end FRL by designing the loss function. The dynamic driving suggestions guide the agents to learn the rules, enabling them to cope with complex urban driving environments and dense traffic scenarios. The present disclosure introduces federated learning to train models by the method of parameter aggregation. The federated learning architecture accelerates network convergence, reduces communication consumption. The multi-agent architecture in the algorithmic framework not only improves the sample efficiency, but the trained models also exhibit high robustness and generalization.

The present disclosure also proposes a vehicular device, the vehicular device being capable of executing the contents of the complex network cognition-based FRL end-to-end autonomous driving control system, or complex network cognition-based FRL end-to-end autonomous driving control method.

A serious of detailed descriptions above are only specific descriptions of the practicable mode of implementation of the present disclosure and are not intended to limit the scope of protection of the present disclosure. Any equivalent mode or modification that does not depart from the technology of the present disclosure is included in the scope of protection of the present disclosure.

What is claimed is:

1. A complex network cognition-based federated reinforcement learning (FRL) end-to-end autonomous driving control system comprising: a measurement encoder, an image encoder, a complex network cognition module, a reinforcement learning module, and a federated learning module, wherein:

the measurement encoder is implemented by at least one processor and is configured to obtain state quantities required by the complex network cognition module, which is implemented by the at least one processor, and the reinforcement learning module, which is implemented by the at least one processor, the state quantities required by the complex network cognition module comprise a x-coordinate, a y-coordinate, a heading angle change and a speed of a given driving agent of a plurality of driving agents, the state quantities required by the complex network cognition module are handed over to the complex network cognition module as inputs, the state quantities required by the reinforcement learning module comprise a steering wheel angle, a throttle, a brake, a gear, a lateral speed and a longitudinal speed, the state quantities required by the reinforcement learning module are given to the reinforcement learning module after extracting features from a two-layer fully connected network;

the image encoder is implemented by the at least one processor and is configured to obtain an amount of image implicit state required by the reinforcement learning module, an image used is a 15-channel semantic bird's eye view (BEV), $i_{RL} \in [0, 1]^{192*192*15}$, 192 is in pixels and the BEV used is 5 px/m, 15 channels contain a drivable domain, a desired path, a road edge, 4 frames of other vehicles, 4 frames of pedestrians, and 4 frames of traffic signs, wherein the desired path is calculated using an A* algorithm, the semantic BEV is extracted by multilayer convolutional layers to extract implicit features and then passed to the reinforcement learning module as another part of the inputs;

the complex network cognition module is configured to model a driving situation of a driving subject, and to obtain a maximum risk value of the driving subject in a current driving situation according to the state quantity provided by the measurement encoder, and finally to output dynamic driving suggestions based on a risk value through an activation function;

the reinforcement learning module is configured to integrate the state quantities output from the measurement encoder and the image encoder, output corresponding strategies according to integrated network inputs, and interact with an environment to generate experience samples stored in a local replay buffer in the federated learning module, which is implemented by the at least one processor, when a number of the experience samples reaches a certain threshold, a batch of sample is taken from the local replay buffer for training, and finally trained neural network parameters are uploaded to the federated learning module; and the federated learning module is configured to receive the finally trained neural network parameters uploaded by the reinforcement learning module of the plurality of driving agents, and to aggregate a set of global parameters based on the finally trained neural network parameters, and finally to send the global parameters to the plurality of driving agents until a neural network converges, a global parameter aggregation is performed by a following equation:

$$\phi_m^* = \frac{1}{N}\sum_n \phi_m^n$$

wherein $\phi_m^*$ denotes the global parameters at time m, N denotes a number of the plurality of driving agents, and $\phi_m^n$ denotes the neural network parameters at time m of an nth driving agent of the plurality of driving agents;

wherein the activation function is configured to map the risk value, Activate(Risk) represents different activation functions according to different driving suggestions, and the mapped risk value will be used as a basis for guiding an output strategy of the reinforcement learning module:

$$\text{Activate}_{go}(\text{Risk}) = \frac{4}{(1+\exp(-300/\text{Risk}))-1}$$

$$\text{Activate}_{stop}(\text{Risk}) = \frac{4}{(1+\exp(-0.2*\text{Risk}))-1}$$

wherein $\text{Activate}_{go}(\text{Risk})$ denotes an activation function when a driving suggestion is forward, $\text{Activate}_{stop}(\text{Risk})$ denotes an activation function when the driving suggestion is stop, and Risk denotes a current risk value of a self-vehicle, a dynamic risk suggestion $B_{risk}$:

$$B_{risk} = B(\text{Activate}_{go}(\text{Risk}), \beta_{go}), \text{go}$$

$$B_{risk} = B(\alpha_{stop}, \text{Activate}_{stop}(\text{Risk})), \text{stop}$$

wherein B denotes a beta distribution with $\alpha_{stop}=\beta_{go}=1$.

2. The complex network cognition-based FRL end-to-end autonomous driving control system according to claim 1, wherein a modeling process of the complex network cognition module constructs a dynamic complex network model with a traffic participant and a road infrastructure as nodes:

$$G_t = (P, E, W, \Theta)_t$$

wherein $G_t$ denotes a dynamic complex network at a moment t, $P=\{p_1, p_2, \ldots, p_N\}$ is a set of nodes, and a number of nodes is N; $E=\{e_{1,2}, e_{1,3}, \ldots, e_{i,j}\}$ is a set of edges, and a number of edges is $$\frac{N(N-1)}{2},$$

and $e_{i,j}$ stands for a connectivity between nodes $p_i$ and $p_j$; $W=\{w_{1,2}, w_{1,3}, \ldots, w_{i,j}\}$ is a set of weights of the edges, $w_{i,j}$ represents a coupling strength between nodes $p_i$ and $p_j$; $\Theta$ is an active region of the nodes, representing dynamic constraints on the set of nodes in the dynamic complex network, model $\Theta$ as a smooth bounded surface:

$$F_\Theta(x, y, z) = 0, \text{ s.t. } \forall (x, y) \in \Omega$$

wherein $\Omega$ is a boundary of a representation of a slip surface, consider a continuous time dynamic complex network with N nodes on $\Theta$ with a node state equation of a form:

$$\dot{X}_i = A_i X_i + B_i U_i$$

wherein $X_i \in R^m$ denotes a state vector of the node $p_i$, $R^m$ denotes a vector space consisting of m-dimensional real numbers R, $U_i \in R^q$ is an input vector, $R^q$ denotes a vector space consisting of q-dimensional real numbers R, $A_i$ denotes a dynamic matrix, $B_i$ denotes an input matrix, based on the node state equation, an output vector of the node $p_i$ can be obtained:

$$Y_i = f_i(X_i)$$

wherein $f_i$ denotes an output function of the node $p_i$, then a weight function between the nodes $p_i$ and $p_j$ is:

$$w_{ij} = F(Y_i, Y_j)$$

wherein F denotes the weight function between the nodes $p_i$ and $p_j$.

3. The complex network cognition-based FRL end-to-end autonomous driving control system according to claim 2, wherein a Gaussian function is used in the dynamic complex network to reveal a static property between nodes:

$$S_{sta} = C_a \cdot \exp\left(-\frac{(x-x_0)^2}{a_x^2} - \frac{(y-y_0)^2}{b_y^2}\right)$$

wherein $S_{sta}$ denotes a static field strength, $C_a$ denotes a field strength coefficient, $x_0$ and $y_0$ denote a coordinate of a risk center $O(x_0, y_0)$, and $a_x$ and $b_y$ denote vehicle appearance coefficients, respectively, a safety field is characterized by shape anisotropy:

$$\varepsilon = \frac{a_x^2 - b_y^2}{a_x^2 + b_y^2} = \frac{\phi^2 - 1}{\phi^2 + 1}$$

$$\phi = a_x/b_y = l_v/w_v$$

wherein $\phi$ is an aspect ratio, $l_v$ denotes a vehicle length, and $w_v$ denotes a vehicle width.

4. The complex network cognition-based FRL end-to-end autonomous driving control system according to claim 3, wherein a series of isofield lines are used to delineate the safety field, a top view projection of the series of isofield lines is a region covered by a series of ellipses, with a region covered by a smallest center ellipse being a core domain, a region between the smallest center ellipse and a second ellipse being a limited domain, and a region between the second ellipse and a largest ellipse being an extended domain, size and shape of the region are determined by the series of isofield lines, are related to a vehicle shape and a motion state, and are described based on the Gaussian function, a direction of the safety field is aligned with a direction of vehicle motion, when a vehicle is in motion, the risk center $O(x_0, y_0)$ of the safety field will be transferred to a new risk center $O'(x'_0, y'_0)$:

$$\begin{cases} x'_0 = x_0 + k_v |\vec{v}| \cos\beta \\ y'_0 = y_0 + k_v |\vec{v}| \sin\beta \end{cases}$$

wherein $k_v$ denotes a moderating factor and $k_v \ni \{(-1, 0) \cup (0,1)\}$, $k_v$'s positive or negative is related to the direction of vehicle motion, and $\beta$ denotes an angle of a transfer vector $k_v |\vec{v}|$ with axes in a Cartesian coordinate system, a virtual vehicle, with a vehicle length $l'_v$ and a vehicle width $w'_v$, is formed under risk center transfer, a dynamic safety field:

$$S_{dyn} = C_a \cdot \exp\left(-\frac{(x-x'_0)^2}{(a'_x)^2} - \frac{(y-y'_0)^2}{(b'_y)^2}\right)$$

wherein $S_{syn}$ denotes a dynamic field strength and a new aspect ratio is denoted as $\phi'=a'_x/b'_y=l'_v/w'_v$, as the motion state of the virtual vehicle changes, a shape of a Gaussian safety field changes, thus changing three fields covered by the safety field: a core region, a limited region and an extended region.

5. The complex network cognition-based FRL end-to-end autonomous driving control system according to claim 4, wherein a risk perception is categorized into three types on a planar scale based on different levels of human driving reaction time: a first cognitive domain, a second cognitive domain and an extra-domain space, wherein:

the first cognitive domain:

$$a'_x \leq s_{th1}$$

$$s_{th1} = t_{c1} \cdot v_e$$

the second cognitive domain:

$$s_{th1} < a'_x \leq s_{th2}$$

$$s_{th2} = t_{c2} \cdot v_e$$

the extra-domain space:

$$s_{th2} < a'_x$$

wherein $s_{th1}$ denotes a first cognitive domain threshold, obtained from a human driving a first reaction time $t_{c1}$ and a maximum approach speed $v_e$ of other nodes relative to the self-vehicle, $s_{th2}$ denotes a second cognitive domain threshold, obtained from a human driving a second reaction time $t_{c2}$ and the maximum approach speed $v_e$ of the other nodes relative to the self-vehicle, establish a risk perception function between nodes under a dynamic safety field model:

$$\text{Risk}(p_i, p_j) = |\vec{S_{i,j}}|\exp(-k_c|\vec{v}|\cos\theta_{i,j})$$

wherein $$|\vec{S_{i,j}}|$$

denotes a field strength of the node $p_i$ at the node $p_j$, $k_c$ denotes a risk-adjustment cognitive coefficient, $|\vec{v_j}|$ denotes a scalar velocity of the node $p_j$, and $\theta_{i,j}$ denotes an angle (positive in a clockwise direction) between a velocity vector $\vec{v}_j$ of the node $p_j$ and a field strength vector $$\vec{S_{i,j}},$$

a risk value $\text{Risk}(p_i, p_j)$, obtained through the risk perception function, indicates a coupling strength between nodes, wherein the risk value and the coupling strength are positively correlated.

6. The complex network cognition-based FRL end-to-end autonomous driving control system according to claim 1, wherein a CARLA simulator is used as an interaction environment, the CARLA simulator realizes vehicle control by inputting control quantities of a steering, a throttle and a brake, wherein steering $\in [-1, 1]$, throttle $\in [0, 1]$ and brake $\in [0, 1]$, based on a CARLA simulator's control method, a reinforcement learning action space $\in [-1, 1]^2$, is categorized into the steering and a throttle-brake, when outputting the throttle-brake, $[-1, 0]$ denotes the brake and $[0, 1]$ denotes the throttle, the driving control system outputs two parameters of the beta distribution by the reinforcement learning module, and then obtains a policy action by sampling:

$$\text{Beta} = B(\alpha, \beta), \alpha, \beta > 0$$

an interaction process produces an experience, described by a tuple, containing a previous moment state quantity, the policy action, a reward function, a next moment state quantity, and the dynamic driving suggestion, calculate a weighted reward function with a mapped risk value as a weight for a termination state-related reward:

$$r = r_{speed} + r_{position} + r_{action} + \text{Activate}(\text{Risk}) * r_{terminal}$$

$$r_{speed} = \frac{1 - |v - v_{desire}|}{v_{max}}$$

$$r_{position} = -0.5 * \Delta d - \Delta\theta$$

wherein $r_{speed}$ denotes a speed-related reward function, $r_{position}$ denotes a position-related reward function, $r_{action}$ denotes an action-related reward function, $r_{terminal}$ denotes a termination state-related reward function, v denotes a vehicle speed, $v_{desire}$ denotes a desired speed, and $v_{max}=6$ m/s denotes a maximum speed, $\Delta d$ denotes a vehicle lateral distance from the desired path, and $\Delta\theta$ denotes an angle between a vehicle traveling direction and a tangent line of the desired path, table 1 describes values of the $r_{action}$ and the $r_{terminal}$ in detail, wherein $\Delta$steering denotes an amount of steering wheel angle change in two frames

TABLE 1

| Reward | Condition | Value |
| --- | --- | --- |
| $r_{action}$ | $\Delta$steering $\geq 0.01$ | $-1 - v$ |
| $r_{terminal}$ | Run red light | $-1 - v$ |
| | Run stop sign | $-1 - v$ |
| | Collision | $-1 - v$ |
| | Route deviation | $-1$ |
| | Blocked | $-1$. |

7. The complex network cognition-based FRL end-to-end autonomous driving control system according to claim 6, wherein in a training process, a parameter updating is performed through following loss functions for the reinforcement learning module:

$$\theta_{k+1} = \arg\max_\theta \underset{\tau \sim \pi_{\theta_k}}{E} [\mathcal{L}_{ppo} + \mathcal{L}_{exp} + \mathcal{L}_{risk}]$$

$$\mathcal{L}_{exp} = -\lambda_{exp} * H(\pi_\theta(\cdot|i_{RL}, m_{RL}))$$

$$H(\pi_\theta) = -KL(\pi_\theta \| \mathcal{U}(-1, 1))$$

$$\mathcal{L}_{risk} = \lambda_{risk} * \mathbb{1}_{\{T-N_z+1,\ldots,T\}}(k)$$

$$* KL(\pi_\theta(\cdot|i_{RL,k}, m_{RL,k}) \| B_{risk})$$

wherein $\mathcal{L}_{ppo}$ denotes a clipped policy gradient loss with advantages estimated using a generalized advantage estimation, $\mathcal{L}_{exp}$ denotes a maximum entropy loss, $H(\pi_\theta(\cdot|i_{RL}, m_{RL}))$ denotes an entropy of a policy $\pi_\theta$ under an image input $i_{RL}$ and a measurement input $m_{RL}$, and $\mathcal{U}(-1, 1)$ denotes a uniform distribution, $L_{exp}$ encourage the given driving agent to explore by converging an action distribution to the uniform distribution, $\lambda_{exp}$ denotes a weight of the maximum entropy loss, $\mathcal{L}_{risk}$ denotes dynamic risk suggestions based loss, and $\mathbb{1}_{\{T-N_z+1,\ldots,T\}}(k)$ denotes a calculation of a KL-divergence of the strategy output by the driving subject $N_z=100$ steps before a termination state and the dynamic driving suggestions to realize a guidance of the given driving agent, and $\lambda_{risk}$ denotes a weight of a dynamic suggestions loss.

8. The complex network cognition-based FRL end-to-end autonomous driving control system according to claim 1, wherein in a training process, a parameter updating is performed through following loss functions for the reinforcement learning module:

$$\theta_{k+1} = \arg\max_\theta \underset{\tau \sim \pi_{\theta_k}}{E} [\mathcal{L}_{ppo} + \mathcal{L}_{exp} + \mathcal{L}_{risk}]$$

$$\mathcal{L}_{exp} = -\lambda_{exp} * H(\pi_\theta(\cdot|i_{RL}, m_{RL}))$$

$$H(\pi_\theta) = -KL(\pi_\theta \| \mathcal{U}(-1, 1))$$

-continued $$\mathcal{L}_{risk} = \lambda_{risk} * \mathbb{1}_{\{T-N_z+1,\ldots,T\}}(k)$$
$$* KL\left(\pi_\theta(\cdot | i_{RL,k}, m_{RL,k}) \| B_{risk}\right)$$

wherein $\mathcal{L}_{ppo}$ denotes a clipped policy gradient loss with advantages estimated using a generalized advantage estimation, $\mathcal{L}_{exp}$ denotes a maximum entropy loss, $H(\pi_\theta(\cdot|i_{RL}, m_{RL}))$ denotes an entropy of a policy $\pi_\theta$ under an image input $i_{RL}$ and a measurement input $m_{RL}$, and $\mathcal{U}(-1, 1)$ denotes a uniform distribution, $\mathcal{L}_{exp}$ encourage the given driving agent to explore by converging an action distribution to the uniform distribution, $\lambda_{exp}$ denotes a weight of the maximum entropy loss, $\mathcal{L}_{risk}$ denotes dynamic risk suggestions based loss, and $\mathbb{1}_{\{T-N_z+1,\ldots,T\}}(k)$ denotes a calculation of a KL-divergence of the strategy output by the driving subject $N_z=100$ steps before a termination state and the dynamic driving suggestions to realize a guidance of the given driving agent, and $\lambda_{risk}$ denotes a weight of a dynamic suggestions loss.

9. A complex network cognition-based FRL end-to-end autonomous driving control method, comprising the following steps:

step 1: building an urban dense traffic simulation environment in a CARLA simulator, wherein the simulation environment contains a driving subject, traffic participants, and a road infrastructure, the driving subject is a plurality of agents, modeled as Markov decision processes, respectively, and using a reinforcement learning module implemented by at least one processor for a steering wheel, a throttle and a brake control, the Markov decision process is described by a tuple (S, A, P, R, γ), wherein S denotes a state set, corresponding to state quantities acquired by a measurement encoder implemented by the at least one processor and an image encoder implemented by the at least one processor, and contains a steering wheel angle, a throttle, a brake, a gear, lateral and longitudinal speeds, and a 15-channel semantic BEV; A denotes an action set, corresponding to the steering wheel, the throttle, and the brake control quantities of the driving subject; P denotes a state transfer equation p: S×A→P (S), each state-action pair (s, a)∈S×A has a probability distribution p(·|s, a) of entering a new state after adopting an action a, in a state s; R denotes a reward function R: S×X×A→R, $R(s_{t+1}, s_t, a_t)$ denotes a reward obtained after entering the new state $s_{t+1}$ from an original state $s_t$, a goodness of performing the action is defined by the reward function; γ denotes a discount factor, γ∈ [0, 1], is configured to compute a cumulative reward $\eta(\pi_\theta)=\Sigma_{i=0}^T \gamma^i r_i$, wherein T denotes a current moment, $\gamma^i$ denotes a discount factor of moment i, and $r_i$ denotes an immediate reward of moment i, a solution to the Markov decision process is to find a strategy π: S→A maximize the cumulative reward $\pi^*:=\mathrm{argmax}_\theta \eta$ $(\pi_\theta)$, the reinforcement learning module integrates implicit state quantities output by the measurement encoder and the image encoder and outputs a corresponding optimal control policy;

step 2: building the complex network cognition module implemented by the at least one processor to model a driving situation of the driving subject, establish a complex network model, and output dynamic driving suggestions based on state quantities provided by the measurement encoder through an activation function, the complex network model represents a dynamic relationship between nodes within a field range through a variable Gaussian safety field based on risk center transfer, the nodes contain the driving subject, the traffic participants, and the road infrastructure;

step 3: constructing an end-to-end neural network, comprising 2 fully connected layers used by the measurement encoder, 6 convolutional layers used by the image encoder and 6 fully connected layers used by the reinforcement learning module, the neural network has two output heads, an action head and a value head, the action head outputs two parameters of a beta distribution and the value head outputs a value of the action;

step 4: interacting the driving subject with a CARLA simulation environment and storing experiences in respective local replay buffers, wherein when the a number of samples reaches a certain threshold, samples of the number of samples are sampled from the respective local replay buffer according to a mini-batch, and then neural network parameters are updated according to a designed loss function;

step 5: uploading the neural network parameters corresponding to each driving subject to a federated learning module implemented by the at least one processor, aggregating global parameters based on the neural network parameters according to an aggregation interval, and sending the global parameters to each agent until the neural network converges;

wherein in step 1, the traffic participants comprise other vehicles and pedestrians, the road infrastructure contains traffic lights and traffic signs, represented in the image encoder input using a 4-frame semantic BEV;

in step 2, the complex network cognition module takes different activation functions according to different driving suggestions:

$$\mathrm{Activate}_{go}(\mathrm{Risk}) = \frac{4}{(1 + \exp(-300/\mathrm{Risk})) - 1}$$

$$\mathrm{Activate}_{stop}(\mathrm{Risk}) = \frac{4}{(1 + \exp(-0.2 * \mathrm{Risk})) - 1}$$

in step 2, the dynamic driving suggestions are represented using the beta distribution:

$$B_{risk} = B(\mathrm{Activate}_{go}(\mathrm{Risk}), \beta, \mathrm{go}$$

$$B_{risk} = B(\alpha, \mathrm{Activate}_{stop}(\mathrm{Risk})), \mathrm{stop}$$

in step 3, the neural network of the measurement encoder uses a Relu activation function for the 2 fully connected layers, the neural network of the image encoder uses the Relu activation function for the 5 convolutional layers except for the last convolutional layer that spreads a state volume without using any activation function, the neural network of the reinforcement learning module uses a Softplus activation function for a last layer of the action head, a last layer of the value head does not use any activation function, the other fully connected layers use the Relu activation function;

in step 4, a set of parameters used in the training process: a learning rate 0.00001; a total step size 12288; a mini-batch sampling size 256; a set of loss function weights $\lambda_{ppo}$ 0.5, $\lambda_{exp}$ 0.01, and $\lambda_{risk}$ 0.05, respectively; a range of a PPO clip 0.2; and a pair of parameters, γ 0.99 and λ 0.9, for a generalized advantage estimation;

in step 4, the loss function used for the training process uses dynamic risk suggestions based loss $\mathcal{L}_{risk}$, a guidance of the agent is realized by calculating a KL-divergence of the strategy and the dynamic driving suggestions output by the driving subject $N_z=100$ steps before a termination state;

in step 5, the federated learning module is a multi-agent framework that uses a local replay buffer architecture between agents; and in step 5, a global parameter aggregation uses a parameter-averaged aggregation method with the aggregation interval of 256.

10. A vehicular device, wherein the vehicular device includes A complex network cognition-based FRL end-to-end autonomous driving control system comprising: a measurement encoder, an image encoder, a complex network cognition module, a reinforcement learning module, and a federated learning module, wherein:

the measurement encoder is implemented by at least one processor and is configured to obtain state quantities required by the complex network cognition module, which is implemented by the at least one processor, and the reinforcement learning module, which is implemented by the at least one processor, the state quantities required by the complex network cognition module comprise a x-coordinate, a y-coordinate, a heading angle change and a speed of a given driving agent of a plurality of driving agents, the state quantities required by the complex network cognition module are handed over to the complex network cognition module as inputs, the state quantities required by the reinforcement learning module comprise a steering wheel angle, a throttle, a brake, a gear, a lateral speed and a longitudinal speed, the state quantities required by the reinforcement learning module are given to the reinforcement learning module after extracting features from a two-layer fully connected network;

the image encoder is implemented by the at least one processor and is configured to obtain an amount of image implicit state required by the reinforcement learning module, an image used is a 15-channel semantic bird's eye view (BEV), $i_{RL} \in [0, 1]^{192*192*15}$, 192 is in pixels and the BEV used is 5 px/m, 15 channels contain a drivable domain, a desired path, a road edge, 4 frames of other vehicles, 4 frames of pedestrians, and 4 frames of traffic signs, wherein the desired path is calculated using an A* algorithm, the semantic BEV is extracted by multilayer convolutional layers to extract implicit features and then passed to the reinforcement learning module as another part of the inputs;

the complex network cognition module is configured to model a driving situation of a driving subject, and to obtain a maximum risk value of the driving subject in a current driving situation according to the state quantity provided by the measurement encoder, and finally to output dynamic driving suggestions based on a risk value through an activation function;

the reinforcement learning module is configured to integrate the state quantities output from the measurement encoder and the image encoder, output corresponding strategies according to integrated network inputs, and interact with an environment to generate experience samples stored in a local replay buffer in the federated learning module, which is implemented by the at least one processor, when a number of the experience samples reaches a certain threshold, a batch of sample is taken from the local replay buffer for training, and finally trained neural network parameters are uploaded to the federated learning module; and the federated learning module is configured to receive the finally trained neural network parameters uploaded by the reinforcement learning module of the plurality of driving agents, and to aggregate a set of global parameters based on the finally trained neural network parameters, and finally to send the global parameters to the plurality of driving agents until a neural network converges, a global parameter aggregation is performed by a following equation:

$$\phi_m^* = \frac{1}{N} \sum_n \phi_m^n$$

wherein $\phi_m^*$ denotes the global parameters at time m, N denotes a number of the plurality of driving agents, and $\phi_m^n$ denotes the neural network parameters at time m of an nth driving agent of the plurality of driving agents;

wherein the activation function is configured to map the risk value, Activate(Risk) represents different activation functions according to different driving suggestions, and the mapped risk value will be used as a basis for guiding an output strategy of the reinforcement learning module:

$$\text{Activate}_{go}(\text{Risk}) = \frac{4}{\left(1 + \exp(-300/(\text{Risk}))\right)} - 1$$

$$\text{Activate}_{stop}(\text{Risk}) = \frac{4}{(1 + \exp(-0.2 * (\text{Risk})))} - 1$$

wherein $\text{Activate}_{go}(\text{Risk})$ denotes an activation function when a driving suggestion is forward, $\text{Activate}_{stop}(\text{Risk})$ denotes an activation function when the driving suggestion is stop, and Risk denotes a current risk value of a self-vehicle, a dynamic risk suggestion $B_{risk}$:

$$B_{risk} = B(\text{Activate}_{go}(\text{Risk}), \beta), \text{ go}$$

$$B_{risk} = B(\alpha, \text{Activate}_{stop}(\text{Risk})), \text{ stop}$$

wherein B denotes a beta distribution with $\alpha_{stop} = \beta_{go} = 1$.

11. The vehicular device according to claim 10, wherein in the complex network cognition-based FRL end-to-end autonomous driving control system, a modeling process of the complex network cognition module constructs a dynamic complex network model with the traffic participant and the road infrastructure as nodes;

$$G_t = (P, E, W, \Theta)_t$$

wherein $G_t$ denotes a dynamic complex network at a moment t, $P = \{p_1, p_2, \ldots, p_N\}$ is a set of nodes, and a number of nodes is N; $E = \{e_{1,2}, e_{1,3}, \ldots, e_{i,j}\}$ is a set of edges, and a number of edges is $$\frac{N(N-1)}{2},$$

and $e_{i,j}$ stands for a connectivity between nodes $p_i$ and $p_j$; $W = \{w_{1,2}, w_{1,3}, \ldots, w_{i,j}\}$ is a set of weights of the edges, $w_{i,j}$ represents a coupling strength between nodes $p_i$ and $p_j$; $\Theta$ is an active region of the nodes, representing dynamic constraints on the set of nodes in the dynamic complex network, model $\Theta$ as a smooth bounded surface:

$$F_\Theta(x, y, z) = 0, \text{ s.t. } \forall (x, y) \in \Omega$$

wherein Ω is a boundary of a representation of a slip surface, consider a continuous time dynamic complex network with N nodes on Θ with a node state equation of a form:

$$\dot{X}_i = A_i X_i + B_i U_i$$

wherein $X_i \in R^m$ denotes a state vector of the node $p_i$, $R^m$ denotes a vector space consisting of m-dimensional real numbers R, $U_i \in R^q$ is an input vector, $R^q$ denotes a vector space consisting of q-dimensional real numbers R, $A_i$ denotes a dynamic matrix, $B_i$ denotes an input matrix, based on the node state equation, an output vector of the node $p_i$ can be obtained:

$$Y_i = f_i(X_i)$$

wherein $f_i$ denotes an output function of the $p_i$ node, then a weight function between the nodes $p_i$ and $p_j$ is:

$$w_{ij} = F(Y_i, Y_j)$$

wherein F denotes the weight function between the nodes $p_i$ and $p_j$.

12. The vehicular device according to claim 11, wherein in the complex network cognition-based FRL end-to-end autonomous driving control system, a Gaussian function is used in the dynamic complex network to reveal a static property between nodes:

$$S_{sta} = C_a \cdot \exp\left(-\frac{(x-x_0)^2}{a_x^2} - \frac{(y-y_0)^2}{b_y^2}\right)$$

wherein $S_{sta}$ denotes a static field strength, $C_a$ denotes a field strength coefficient, $x_0$ and $y_0$ denote a coordinate of a risk center $O(x_0, y_0)$, and $a_x$ and $b_y$ denote vehicle appearance coefficients, respectively, a safety field is characterized by shape anisotropy:

$$\varepsilon = \frac{a_x^2 - b_y^2}{a_x^2 + b_y^2} = \frac{\phi^2 - 1}{\phi^2 + 1}$$

$$\phi = a_x/b_y = l_v/w_v$$

wherein $\phi$ is an aspect ratio, $l_v$ denotes a vehicle length, and $w_v$ denotes a vehicle width.

13. The vehicular device according to claim 12, wherein in the complex network cognition-based FRL end-to-end autonomous driving control system, a series of isofield lines are used to delineate the safety field, a top view projection of the series of isofield lines is a region covered by a series of ellipses, with a region covered by a smallest center ellipse being a core domain, a region between the smallest center ellipse and a second ellipse being a limited domain, and a region between the second ellipse and a largest ellipse being an extended domain, size and shape of the region are determined by the series of isofield lines, are related to a vehicle shape and a motion state, and are described based on the Gaussian function, a direction of the safety field is aligned with a direction of vehicle motion, when a vehicle is in motion, the risk center $O(x_0, y_0)$ of the safety field will be transferred to a new risk center $O'(x'_0, y'_0)$:

$$\begin{cases} x'_0 = x_0 + k_v |\vec{v}| \cos\beta \\ y'_0 = y_0 + k_v |\vec{v}| \sin\beta \end{cases}$$

wherein $k_v$ denotes a moderating factor and $k_v \ni \{(-1, 0) \cup (0, 1)\}$, $k_v$'s positive or negative is related to the direction of vehicle motion, and $\beta$ denotes an angle of a transfer vector $k_v|\vec{v}|$ with axes in a Cartesian coordinate system, a virtual vehicle, with a vehicle length $l'_v$ and a vehicle width $w'_v$, is formed under the risk center transfer, a dynamic safety field:

$$S_{dyn} = C_a \cdot \exp\left(-\frac{(x-x'_0)^2}{(a'_x)^2} - \frac{(y-y'_0)^2}{(b'_y)^2}\right)$$

wherein $S_{dyn}$ denotes a dynamic field strength and a new aspect ratio is denoted as $\phi' = a'_x/b'_y = l'_v/w'_v$, as the motion state of the virtual vehicle changes, a shape of a Gaussian safety field changes, thus changing three fields covered by the safety field: a core region, a limited region and an extended region.

14. The vehicular device according to claim 13, wherein in the complex network cognition-based FRL end-to-end autonomous driving control system, a risk perception is categorized into three types on a planar scale based on different levels of human driving reaction time: a first cognitive domain, a second cognitive domain and an extra-domain space, wherein:

the first cognitive domain:

$$a'_x \leq s_{th1}$$

$$s_{th1} = t_{c1} \cdot v_e$$

the second cognitive domain:

$$s_{th1} < a'_x \leq s_{th2}$$

$$s_{th2} = t_{c2} \cdot v_e$$

the extra-domain space:

$$s_{th2} < a'_x$$

wherein $s_{th1}$ denotes a first cognitive domain threshold, obtained from a human driving a first reaction time $t_{c1}$ and a maximum approach speed $v_e$ of other nodes relative to the self-vehicle, $s_{th2}$ denotes a second cognitive domain threshold, obtained from a human driving a second reaction time $t_{c2}$ and the maximum approach speed $v_e$ of the other nodes relative to the self-vehicle, establish a risk perception function between nodes under a dynamic safety field model:

$$\text{Risk}(p_i, p_j) = |\vec{S_{i,j}}| \exp(-k_c|\vec{v_j}|\cos\theta_{i,j})$$

wherein $|\vec{S_{i,j}}|$ denotes a field strength of the node $p_i$ at the node $p_j$, $k_c$ denotes a risk-adjustment cognitive coefficient, $|\vec{v_j}|$ denotes a scalar velocity of the node $p_j$, and $\theta_{i,j}$ denotes an angle (positive in a clockwise direction) between a velocity vector $\vec{v_j}$ of the node $p_j$ and a field strength vector $\vec{S_{i,j}}$, a risk value $\text{Risk}(p_i, p_j)$, obtained through the risk perception function, indicates a coupling strength between nodes, wherein the risk value and the coupling strength are positively correlated.

15. The vehicular device according to claim 10, wherein in the complex network cognition-based FRL end-to-end autonomous driving control system, the CARLA simulator is used as an interaction environment, the CARLA simulator realizes vehicle control by inputting control quantities of a steering, the throttle and the brake, wherein steering $\in [-1, 1]$, throttle $\in [0, 1]$ and brake $\in [0, 1]$, based on a CARLA simulator's control method, a reinforcement learning action space $\in [-1, 1]^2$, is categorized into the steering and a throttle-brake, when outputting the throttle-brake, $[-1, 0]$ denotes the brake and $[0, 1]$ denotes the throttle, the driving control system outputs two parameters of the beta distribution by the reinforcement learning module, and then obtains a policy action by sampling:

$$\text{Beta} = B(\alpha, \beta), \alpha, \beta > 0$$

an interaction process produces an experience, described by a tuple, containing a previous moment state quantity, the policy action, the reward function, a next moment state quantity, and the dynamic driving suggestion, calculate a weighted reward function with a mapped risk value as a weight for a termination state-related reward:

$$r = r_{speed} + r_{position} + r_{action} + \text{Activate}(\text{Risk}) * r_{terminal}$$

$$r_{speed} = \frac{1 - |v - v_{desire}|}{v_{max}}$$

$$r_{position} = -0.5 * \Delta d - \Delta\theta$$

wherein $r_{speed}$ denotes a speed-related reward function, $r_{position}$ denotes a position-related reward function, $r_{action}$ denotes an action-related reward function, $r_{terminal}$ denotes a termination state-related reward function, v denotes a vehicle speed, $v_{desire}$ denotes a desired speed, and $v_{max}$=6 m/s denotes a maximum speed, $\Delta d$ denotes a vehicle lateral distance from the desired path, and $\Delta\theta$ denotes an angle between a vehicle traveling direction and a tangent line of the desired path, table 1 describes values of the $r_{action}$ and the $r_{terminal}$ in detail, wherein $\Delta$steering denotes an amount of steering wheel angle change in two frames

TABLE 1

| Reward | Condition | Value |
|---|---|---|
| $r_{action}$ | $\Delta$steering $\geq$ 0.01 | $-1 - v$ |
| $r_{terminal}$ | Run red light | $-1 - v$ |
| | Run stop sign | $-1 - v$ |
| | Collision | $-1 - v$ |
| | Route deviation | $-1$ |
| | Blocked | $-1$. |

16. The vehicular device according to claim 10, wherein in the complex network cognition-based FRL end-to-end autonomous driving control system, in a training process, a parameter updating is performed through following loss functions for the reinforcement learning module:

$$\theta_{k+1} = \arg\max_\theta \underset{\tau \sim \pi_{\theta_k}}{E} [\mathcal{L}_{ppo} + \mathcal{L}_{exp} + \mathcal{L}_{risk}]$$

$$\mathcal{L}_{exp} = -\lambda_{exp} * H(\pi_\theta(\cdot|i_{RL}, m_{RL}))$$

$$H(\pi_\theta) = -KL(\pi_\theta \| \mathcal{U}(-1, 1))$$

$$\mathcal{L}_{risk} = \lambda_{risk} * \mathbb{1}_{\{T-N_z+1,\ldots,T\}}(k) * KL(\pi_\theta(\cdot|i_{RL,k}, m_{RL,k}) \| B_{risk})$$

wherein $\mathcal{L}_{ppo}$ denotes a clipped policy gradient loss with advantages estimated using a generalized advantage estimation, $\mathcal{L}_{exp}$ denotes a maximum entropy loss, $H(\pi_\theta(\cdot|i_{RL}, m_{RL}))$ denotes an entropy of a policy $\pi_\theta$ under an image input $i_{RL}$ and a measurement input $m_{RL}$, and $\mathcal{U}(-1, 1)$ denotes a uniform distribution, $\mathcal{L}_{exp}$ encourage the given driving agent to explore by converging an action distribution to the uniform distribution, $\lambda_{exp}$ denotes a weight of the maximum entropy loss, $\mathcal{L}_{risk}$ denotes dynamic risk suggestions based loss, and $\mathbb{1}_{\{T-N_z+1,\ldots,T\}}(k)$ denotes a calculation of the KL-divergence of the strategy output by the driving subject $N_z$=100 steps before a termination state and the dynamic driving suggestions to realize the guidance of the given driving agent, and $\lambda_{risk}$ denotes a weight of a dynamic suggestions loss.

\* \* \* \* \*